United States Patent
Cornish (10) Patent No.: US 9,873,813 B2
(45) Date of Patent: Jan. 23, 2018

(54) BIOPROCESSING OF HARVESTED PLANT MATERIALS FOR EXTRACTION OF BIOPOLYMERS AND RELATED MATERIALS AND METHODS

(71) Applicant: Ohio State Innovation Foundation, Columbus, OH (US)

(72) Inventor: Katrina Cornish, Wooster, OH (US)

(73) Assignee: OHIO STATE INNOVATION FOUNDATION, Columbus, OH (US)

(*) Notice: Subject to any disclaimer, the term of this patent is extended or adjusted under 35 U.S.C. 154(b) by 194 days.

(21) Appl. No.: 14/767,429

(22) PCT Filed: Feb. 14, 2014

(86) PCT No.: PCT/US2014/016420
§ 371 (c)(1),
(2) Date: Aug. 12, 2015

(87) PCT Pub. No.: WO2014/127206
PCT Pub. Date: Aug. 21, 2014

(65) Prior Publication Data
US 2015/0376434 A1    Dec. 31, 2015

Related U.S. Application Data

(60) Provisional application No. 61/765,483, filed on Feb. 15, 2013.

(51) Int. Cl.
| F26B 5/06 | (2006.01) |
| C09D 107/02 | (2006.01) |
| F26B 1/00 | (2006.01) |
| B26F 3/00 | (2006.01) |

(52) U.S. Cl.
CPC .............. *C09D 107/02* (2013.01); *B26F 3/00* (2013.01); *F26B 1/00* (2013.01); *F26B 5/065* (2013.01); *F26B 2200/02* (2013.01)

(58) Field of Classification Search
CPC ...................................................... F26B 5/065
See application file for complete search history.

(56) References Cited

U.S. PATENT DOCUMENTS

| | | | | |
|---|---|---|---|---|
| 3,101,757 A | * | 8/1963 | Hanson | B27L 1/02 144/208.1 |
| 3,681,851 A | * | 8/1972 | Fleming | C05F 9/02 34/291 |
| 3,970,091 A | * | 7/1976 | Banks | A24B 5/06 131/313 |
| 4,322,910 A | | 4/1982 | Garbo | |
| 4,962,893 A | * | 10/1990 | Bochmann | B02C 19/06 241/23 |
| 5,171,592 A | * | 12/1992 | Holtzapple | A23J 1/007 426/635 |
| 5,580,942 A | | 12/1996 | Cornish | |
| 5,717,050 A | | 2/1998 | Cornish | |
| 5,887,803 A | * | 3/1999 | Dietrich | B02C 19/186 241/23 |
| 7,259,231 B2 | | 8/2007 | Cornish et al. | |
| 7,399,323 B2 | | 7/2008 | Renninger et al. | |
| 8,431,667 B2 | | 4/2013 | Cornish et al. | |
| 2006/0149015 A1 | * | 7/2006 | Cornish | B01D 11/0284 528/1 |
| 2009/0054595 A1 | | 2/2009 | Cornish et al. | |
| 2010/0012756 A1 | * | 1/2010 | Medoff | C08H 8/00 241/23 |
| 2011/0021743 A1 | | 1/2011 | Cornish et al. | |
| 2011/0201771 A1 | | 8/2011 | Puskas et al. | |
| 2011/0262985 A1 | * | 10/2011 | Medoff | C08B 1/00 435/165 |
| 2012/0063969 A1 | | 3/2012 | Cornish et al. | |

FOREIGN PATENT DOCUMENTS

| EP | 1948715 B1 | 3/2013 |
| WO | 2007081376 A2 | 7/2007 |
| WO | 2013106868 A1 | 7/2013 |

OTHER PUBLICATIONS

Anonymous, RD 389004 A, 1996.*
Anonymous, RD 389004 A, 1996 Derwent Abstract.*
Cornish et al., "Rubber Biosynthesis in Plants", Plant Lipid Biochemistry, 2011, pp. 1-13.
PCT International Search Report and Written Opinion, Application No. PCT/US2014/016420, dated Aug. 21, 2014.

* cited by examiner

*Primary Examiner* — Liam J Heincer
(74) *Attorney, Agent, or Firm* — MacMillan, Sobanski & Todd, LLC (57) ABSTRACT

Methods are provided for rapid and efficient removal and separation of leaves and bark from harvested plant material for use in extraction and purification of plant products, and in particular, the removal of leaves and bark from Guayule for the extraction of latex for use in latex and rubber products.

15 Claims, 6 Drawing Sheets

BIOPROCESSING OF HARVESTED PLANT MATERIALS FOR EXTRACTION OF BIOPOLYMERS AND RELATED MATERIALS AND METHODS

CROSS REFERENCE TO RELATED APPLICATION

This application claims the benefit PCT/US2014/016420 filed Feb. 14, 2014 which claims priority to of U.S. Provisional Application No. 61/765,483 filed Feb. 15, 2013.

STATEMENT REGARDING FEDERALLY SPONSORED RESEARCH

This invention was not made with any government funding, and the government has no rights in the invention.

BACKGROUND OF THE INVENTION

Natural rubber, derived from several plant species, is a core component of many industrial products such as in coatings, films, and packaging. Natural rubber is also used widely in medical devices and consumer items. More specifically, latex is used in medical products including: gloves, catheters, laboratory testing equipment, assays, disposable kits, drug containers, syringes, valves, seals, ports, plungers, forceps, droppers, stoppers, bandages, dressings, examination sheets, wrappings, coverings, tips, shields, and sheaths for endo-devices, solution bags, balloons, thermometers, spatulas, tubing, binding agents, transfusion and storage systems, needle covers, tourniquets, tapes, masks, stethoscopes, medical adhesive, and latex wound-care products.

Post-procedure patient uses for natural rubber include: compression bands, ties, and straps, inflation systems, braces, splints, cervical collars, and other support devices, belts, clothing, and the padding on wheelchairs and crutches. Natural latex is also used in many other common household products such as pacifiers, rubber bands, adhesives, condoms, disposable diapers, art supplies, toys, baby bottles, chewing gum, and electronic equipment, to name just a few.

Natural rubber, an important polymer produced by plants, is a strategically important raw material used in many thousands of products, including hundreds of medical devices. Natural rubber is obtained from latex, an aqueous emulsion present in the laticiferous vessels (ducts) or parenchymal (single) cells of rubber-producing plants. Guayule (*Parthenium argentatum*) is an ideal latex source for medical devices, as it is the only current source of latex that is safe for people with latex allergies. In addition, it is the sole commercially-available natural plant source of rubber of U.S. origin. Other species, such as *Taraxacum kok-saghyz*, are currently under commercial development.

Removal of the leaves from plants prior to extraction and manufacturing processes, in particular rubber producing plants, can be an important step. Conventional methods to remove leaves from harvested plants utilize chemical defoliants, plant growth regulators (hormones), or flame. Such methods can result in environmental and/or health concerns for those performing the removal of leaves. These methods can also result in the destruction or deterioration of desirable products that can be extracted from the plants. For plants such as guayule, which lack a leaf abscission zone, the use of conventional chemical and hormonal defoliants can result in undesirable dehydration of the plant and can irreversibly coagulate the desirable latex contained therein.

BRIEF SUMMARY OF THE INVENTION

The present invention provides methods of separating leaves from branches of harvested plant material comprising: a) contacting at least a portion of harvested plant material having a leaves and branches with at least one cryogenic liquid for at least an amount of time sufficient to produce embrittled leaves; b) applying a force to the plant material sufficient to fracture the embrittled leaves and produce fractured leaves; and c) separating the fractured leaves from the plurality of branches.

Also provided are methods herein, wherein the amount of time is insufficient to embrittle the branches.

Also provided are methods herein, wherein separating is by a method selected from the group consisting of: agitation; vibration; air velocity force; sonic wave force; liquid separation; filtration; electrical force; static electrical force; density separation; particle size separation; screen separation; sieve separation; mesh separation; and threshing.

Also provided are methods herein, wherein the harvested plant material is contacted with the cryogenic liquid for an amount of time selected from the group consisting of: at least about 0.5 seconds to about 3 seconds; at least about 0.5 seconds to about 2 seconds; at least about 0.5 seconds to about 1.5 seconds; at least about 0.5 seconds to about 1 second; at least about 0.8 seconds.

Also provided are methods herein, wherein the harvested plant material is contacted with the cryogenic liquid for at least about 0.5 second to about 2 seconds.

Also provided are methods herein, wherein the amount of time is sufficient to completely embrittle the plurality of branches to form embrittled branches.

Also provided are methods herein, wherein the harvested plant material is contacted with the cryogenic liquid for an amount of time selected from the group consisting of: greater than 3 seconds; greater than 4 seconds; greater than 5 seconds; greater than 6 seconds; greater than 7 seconds; greater than 8 seconds; greater than 8 seconds; and greater than 10 seconds.

Also provided are methods herein, which further comprises rapidly defrosting the embrittled branches.

Also provided are methods herein, wherein defrosting is achieved within a time period from the beginning of contact with the cryogenic liquid selected from the group consisting of: no longer than 11 seconds; no longer than 10 seconds; no longer than 9 seconds; no longer than 8 seconds; no longer than 7 seconds; no longer than 6 seconds; no longer than 5 seconds; no longer than 4 seconds.

Also provided are methods herein, wherein the cryogenic liquid is at least one cryogenic liquid selected from the group consisting of: liquid nitrogen and/or liquid nitrogen vapor; liquid helium and/or liquid helium vapor; liquid neon and/or liquid neon vapor; liquid argon and/or liquid argon vapor; and liquid krypton and/or liquid krypton vapor; liquid hydrogen and/or liquid hydrogen vapor; liquid methane and/or liquid methane vapor; liquefied natural gas and/or liquefied natural gas vapor.

Also provided are methods herein, wherein the cryogenic liquid is liquid nitrogen.

Also provided are methods herein, wherein contacting is achieved by at least one method selected from the group consisting of: spraying; dipping; pouring; and exposing.

Also provided are methods herein, wherein contacting is achieved in a vessel selected from the group consisting of: open vat; closed vat; bucket; open chamber; closed chamber; package; box; and bag.

Also provided are methods herein, wherein applying a force is via at least one means selected from the group consisting of: one or more roller assemblies; one or more flat objects; and one or more plates.

Also provided are methods herein, wherein the method is performed in a continuous process on a conveyor system.

Also provided are methods herein, wherein the harvested plant material is selected from group consisting of: Guayule; rabbitbrush; *Taraxacum kok-saghyz*; a rubber-producing plant.

Also provided are methods herein, wherein the harvested plant material is Guayule.

Also provided are methods herein, wherein the method reduces and/or eliminates coagulation of latex in the Guayule plant.

The present invention also provides methods of separating a plurality of bark from a plurality of plant branches comprising: a) contacting a plurality of plant branches having a plurality of bark and a plurality of woody cores with a cryogenic liquid for an amount of time sufficient to embrittle the plurality of bark; b) applying a compression or mechanical force to the plurality of plant branches sufficient to fracture the plurality of bark but not the plurality of woody cores so as to produce bark particles and woody cores; and c) separating the bark particles from the woody cores.

The present invention also provides methods of removing a plurality of leaves and a plurality of bark from a harvested plant material comprising: a) contacting a harvested plant material having a plurality of leaves, a plurality of bark, and a plurality of woody cores, with a cryogenic liquid for an amount of time sufficient to embrittle the plurality of leaves and the plurality of bark; b) applying a compression or mechanical force to the plant material sufficient to fracture the plurality of leaves and the plurality of bark, but not the plurality of woody cores, to form leaf particles, bark particles, and woody cores; and c) separating the leaf particles and the bark particles from the woody cores.

The present invention also provides methods of producing natural rubber latex for thin film applications comprising: a) contacting a harvested Guayule plant having a plurality of leaves and a plurality of branches with at least one cryogenic liquid for a period of time sufficient to embrittle the plurality of leaves; b) applying a compression or mechanical force to the harvested Guayule plant to fracture the plurality of leaves to form leaf particles and branches; c) separating the leaf particles from the branches; d) collecting the branches; e) grinding the branches to form a homogenate; f) combining the homogenate with at least one solvent to extract a plurality of latex from the branches to form extracted latex; g) purifying the extracted latex; and h) producing a natural rubber latex for thin film applications.

The present invention also provides methods of producing natural rubber latex for thin film applications comprising: a) contacting a harvested Guayule plant having a plurality of leaves and a plurality of branches with at least one cryogenic liquid for a period of time sufficient to embrittle the plurality of leaves; b) applying a compression or mechanical force to the harvested Guayule plant to fracture the plurality of leaves to form leaf particles and branches; c) separating the leaf particles from the branches; d) collecting the branches; e) contacting a branches having a plurality of bark and a plurality of woody cores with at least one cryogenic liquid for a period of time sufficient to embrittle the plurality of bark; f) applying a compression or mechanical force to the branches to fracture the plurality of bark from the plurality of woody cores to form bark particles and branches; g) separating the bark particles from the woody cores; h) collecting the bark particles; i) comminuting the bark particles to a form a bagasse; j) combining the bagasse with the at least one solvent to extract a plurality of latex from the homogenate to form extracted latex; k) purifying the extracted latex; and l) producing natural rubber latex for thin film applications.

The present invention also provides methods of producing natural rubber latex for thin film applications comprising: a) comminuting a plurality of branches produced by the method of Claim 13 to form a bagasse; b) combining the bagasse with at least one solvent to extract a plurality of latex from the bagasse to form extracted latex; c) purifying the extracted latex; and d) producing natural rubber latex for thin film applications.

The present invention also provides methods of producing natural rubber latex for thin film applications comprising: a) comminuting a plurality of bark from Guayule produced by the method of Claim 26 to form a bagasse; b) combining the bagasse with at least one solvent to extract a plurality of latex from the bagasse to form extracted latex; c) purifying the extracted latex; and d) producing natural rubber latex for thin film applications.

Also provided are methods wherein the latex is extracted and purified by a method selected from the methods described in U.S. Pat. No. 7,259,231, U.S. Pat. No. 8,431,667, and WO 2007/081376; U.S. Pat. No. 5,580,942; and U.S. Pat. No. 5,717,050.

Also provided are methods herein, wherein the plant is selected from the group consisting of: Angiosperm; gymnosperm; pteridophytes; and bryophytes.

Also provided are methods herein, wherein the plant is selected from the group consisting of: corn, soybean; sorghum; cotton; rice; beans; sugar cane; sugar beet; wheat; potato; hemp; tobacco; peanut; oat; sunflower; and canola.

Also provided are methods herein, wherein the harvested plant is not dehydrated prior to contacting with the cryogenic liquid.

Also provided are methods herein, wherein the harvested plant is hydrated prior to contacting with the cryogenic liquid.

DETAILED DESCRIPTION OF THE INVENTION

Various objects and advantages of this invention will become apparent to those skilled in the art from the following detailed description of the preferred embodiment, when read in light of the accompanying drawings.

The source of the rubber in some plant species is located in the bark of the branches and roots, and extraction processes require that the plant be ground up before extraction. Guayule and rabbitbrush (*Crysothamnus nauseum*) are examples of such species. To obtain a more pure latex and rubber by aqueous extraction, or by solvent extraction followed by emulsificiation, leaves must be removed from the plant before latex or rubber can be extracted. In some cases, it is also desirable to remove and separate the bark (a de-cortication process) from the rest of the plant before latex or rubber extraction. This process reduces the amount of material entering the latex or rubber extraction processes by at least 50% with a concomitant reduction in extraction cost. This is particularly important for the production of both solid rubber and thin film latex, used to make latex in medical devices, such as examination gloves and condoms. Therefore, the leaves of the plants must be removed and separated from the branches prior to extraction and manufacturing processes. This is also required for many other types of plant derived product processes not related to latex and rubber production.

The invention is related broadly to a method of removing and separating leaves from branches from harvested plants, comprising exposing the harvested plant to a cryogenic liquid for a period of time sufficient to freeze completely and make brittle the thin, more brittle leaves, while not freezing completely and making brittle the branches, followed by applying a crushing or mechanical force to the plant to remove the brittle leaves from the rest of the plant. Additionally, a longer exposure to a cryogenic liquid can be used, followed by a rapid defrost. This process is a very fast, effective, and low cost procedure that maintains the integrity of the desirable products located within the harvested plants. By exposing the plants briefly to cryogenic liquids, the leaves will become brittle and fall off and/or break off when a crushing or mechanical force is applied. The leaves can then be separated from the branches by shaking, blowing, sieves or meshes, density separation methods, and the like, and be used for the extraction of materials present in the leaves. Removal of the leaves prior to extraction eliminates possible contaminants, or if desired, allows for extraction of components present in the leaves themselves. For example, in the case of Guayule, a latex producing plant, the separated leaves can be used to make high quality wax. In addition, for latex extraction from Guayule for use in making thin filmed latex products, the removal of contaminants in the leaves and the time of exposure to cryogenic liquids are such that there is less undesirable coagulation during the extraction process. In addition, for rubber extraction from Guayule using organic solvents for use in making solid rubber products, such as tires, the removal of leaves prior to extraction yields a purer extracted rubber material with a much lower level of contamination with resins and pigments.

The invention also relates broadly to a method of debarking the branches. Following separation of the leaves from the branches, the branches can be exposed to a period of time sufficient to freeze completely and make brittle the bark but not making the woody core of the branches brittle, and without causing irreversible coagulation of the rubber particles contained within the parenchyma cells. Applying another crushing or mechanical force can remove the bark from the branches, thus separating the bark from the woody cores of the branches. The force for separating the woody cores of the branches may be greater than that needed for fracturing the leaves, and can therefore, the leaves and bark separations are optionally accomplished in a stepwise fashion: one force applied for the leaves, followed by a greater force applied to separate the bark. In another embodiment, the leaves and bark may be fractured at simultaneously and processed together or separated post-fracture.

The bark can be the source of the desired product, as is the case for Guayule, in which the latex is located within the fibrous bark material. This process provides a very fast and efficient method of debarking, which saves significant time in the processing of plant products, and can lead to higher, more consistent yields, resulting in a higher quality end product. When latex is the desired product, if the bark is frozen for too long, the bark must be rapidly defrosted by plunging the frozen stems in ambient temperature liquid extraction media, to return the rubber particles to the in situ emulsified form. When solid rubber in desired, using either an aqueous or organic solvent-based processes, rapid defrosting is not required, and it is preferred that slower defrosting in air under ambient conditions is performed, to deliberately coagulate the rubber particles in situ prior to grinding the rubber containing tissues. This method will reduce the loss of rubber during grinding and extraction.

Although the methods of separating leaves and bark from a harvested plant can be performed by simply dipping the plant briefly in a vat of cryogenic liquid on a small scale, the methods can also be used for large scale industrial purposes. Harvested plant products can be placed on a conveyor system as part of a continuous process which passes the plant products through a cryogenic chamber, where the cryogenic liquid is sprayed or poured over the plant material, the conveyor system programmed so that the plant material is exposed to the cryogenic liquid for a pre-ordained amount of time suitable for the particular plant type being used. Following removal from the chamber, a compression or mechanical force can be applied to remove the leaves from the branches, followed by shaking over a sieve or a vibrating mesh belt with perforations of appropriate size to allow the smaller leaves to fall through while leaving the branches on the conveyor system. In addition, blowing of forced air to blow away lighter leaves, threshing equipment, and density separation methods can be used to separate the leaves from the branches. The separated leaves can then undergo traditional industrial milling and processing to form desired products. The separated leafless branches can then undergo traditional industrial milling and processing to form the desired products. Optionally, if so desired, the leafless branches can undergo an additional process to remove the bark from the woody cores of the branches.

To remove the bark, branches can be passed through another cryogenic chamber for a period of time sufficient to freeze the bark and make it brittle, but not freeze the woody core of the branches, followed by another crushing or mechanical force to remove the bark from the branches. The bark can then be mechanically separated from the branches by shaking over a sieve or passed over a vibrating mesh belt having perforations of a size as to allow the smaller bark to fall through while the larger woody core of the branches remain, or other means described above. The separated leaves, bark and woody cores of the branches can then undergo traditional industrial milling and processing to form the desired products.

In an alternative method, a single cryogenic step can be used to freeze leaves and bark. Leaf removal can be performed prior to bark removal, by using two different forces, or simultaneously with bark removal, using the same force, followed by leaf and bark separation using selection density separation methods, such as air columns, threshing equipment and belt or table density separators.

This process is particularly useful in the extraction of hypoallergenic latex from Guayule, and in particular, for the production of thin-filmed latex used in medical devices. For thin filmed latex products, it is important to have pure, consistent latex extracted from Guayule, homogenized into the form of an emulsion, without coagulation of the latex. For making products such as gloves and condoms, it is essential the latex be in an aqueous, emulsion form so it can be molded into the desired shape. Impurities in the leaves can result in a latex that is coagulated, leading to inconsistent and defective thin filmed latex products, and which contains an unacceptably high level of impurities such as soluble proteins, mineral salts, pigments (especially Chlorophylls), and fine non-rubber solids. For use in solid rubber products, such as tires, coagulated latex is desired to form a homogenate to separate out the lower density latex from the other higher density components. The presence of leaves and other solid impurities in the production of solid rubber is not as important, as coagulation is desirable and the leaf components less than 300 nm in size can be useful for providing filler in the solid rubber. However, the presence of solids larger than 300 nm, and contaminating terpene resins, fatty acids and mineral salts can adversely affect solid rubber quality. Such large solids must be filtered from the organic solvent dissolved rubber stream. Solids contamination is especially problematic in the aqueous solid rubber extraction process because they cannot be filtered out.

The methods described herein have the utility of increasing purity and processing of plant extracts, and in particular latex derived from Guayule for thin filmed latex products. In addition, it provides a means to decrease the time and costs of manufacturing plant derived products, and help remove impurities that may limit the beneficial properties of the extracted plant products. Although the methods were derived from work in latex extraction in Guayule plants, the methods can be used for the extraction and manufacturing of other plant products.

Definitions

By "Comminution" it is Meant the Reduction of Solid Materials from One Average Particle size to a smaller average particle size, by crushing, grinding, and other processes. By "comminuted" it is meant reduced to minute particles or fragments. The act of crushing, milling, grinding, pulverizing, and the like, are some methods used to make a comminuted material.

As used herein the term "bagasse" is used to refer to that portion of the ground or chopped plant matter that is insoluble and hence is suspended rather than dissolved by organic solvents or other liquids. As used herein, bagasse should be understood to include dirt and ash, unless otherwise specified.

By "compression or mechanical force" it is meant smashing, whacking, vigorous shaking, vibration, passing through rollers, squeezing between two plates, applying forced air, and pressing, and the like.

For the purposes of this disclosure, "cryogenic liquid" is any liquid with a normal boiling point below −50° C., for example, oxygen, liquid air, liquid nitrogen, and argon. Any number of cryogenic liquids, in addition to liquid nitrogen, are possible. For the purposes of this disclosure, cryogenic liquid also comprises vapor of the cryogenic liquid, and combinations of vapor and liquid phases.

By "embrittle" it is meant to make brittle. A material can become embrittled by exposure to a cryogenic liquid for at least a period of time sufficient for complete freezing of the material.

By "fracture" it is meant to separate or cause to separate into pieces as a result of a compression or mechanical force.

By "agitation" it is mean shaking or vibrating.

Methods of Separating Leaves from Branches

The current disclosure provides methods for separating leaves from branches of harvested plant materials using a cryogenic liquid, followed by a crushing or mechanical force to remove the leaves from the branches. To remove the leaves from the harvested plant material, the harvested plant material is contacted with a cryogenic liquid, for example, liquid nitrogen, for a period of time sufficient to freeze the leaves to make them brittle while not freezing completely and making brittle the branches. The period of time sufficient to freeze the leaves while leaving the branches unfrozen will depend on the particular plant, and this will depend on leaf and branch sizes. Smaller branches and leaves will take less time to freeze completely than larger branches and leaves. The time required to achieve the desired results also varies with the temperature and form of the specific cryogenic liquid used, with the coldest liquids to be used for the shortest times, and vapor forms taking longer. For separation of leaves from branches in rubber producing Guayule, the period of time sufficient to freeze the leaves is at least about 0.2 seconds to at least about 3 seconds. In certain embodiments, the period of time is between about 0.5 seconds to about 2 seconds. In certain embodiments, the period of time of exposure is about 0.8 seconds. In another embodiment, the period of exposure can be greater than about 5 seconds so as to cause complete freezing of the plant material, followed by rapid defrosting. This results in preventing coagulation of resins, e.g. latex, within the plant material, and increased yields, particularly for the extraction of latex for thin filmed uses. A slow defrost following complete freezing results in increased coagulation and reduced yield of latex extracted.

Contact of the harvested plant material with the cryogenic liquid can be performed by dipping into a vat of cryogenic liquid, or passing through a chamber in which the cryogenic liquid is sprayed onto or poured over the harvested plant product, or is in the form of saturated or near-saturated vapor, as the plant product passes through the chamber. Passage of plant material through a cryogenic chamber is more practical for large scale, continuous, industrial purposes than dipping in a vat of cryogenic liquid, which is limited to batch processes. All or a portion of the plant material may be contacted with the cryogenic liquid, which may be in the form of a concentrated cryogenic vapor. It should be noted that this procedure is applied to harvested plants, which may be dried or hydrated, and not on non-harvested plants in the field.

Following the exposure of the harvested plant product to the cryogenic liquid, a compression or mechanical force is applied to the plant material, the compression or mechanical force being enough to break the brittle, frozen leaves off the branches in order to separate the leaves from the branches. The force applied may be done by shaking, vibrating, compression plates, rollers to compress the plants, or any other means to apply a force to the plant material that will break the leaves off the plants. For automated processes, compression plates or rollers are more suitable for use in industrial sized extraction processes. The amount of force or pressure applied in, for example, pounds per square inch, will vary depending on the source of the compression or mechanical force used, for example, using plates to apply the compression or mechanical force will apply a different force in pounds per square inch than say using a finger or a smaller impactor. One of ordinary skill in the art would be able to determine the appropriate amount of a compression or mechanical force required, without undue experimentation. If done manually, the force can be applied by simply shaking the plant material by hand, smacking it against sturdy object, or hitting it lightly with a plate or other object. Alternatively, the force can be applied by mechanical shaking, vibrating, forced air, compressing between at least two flat objects (e.g. plates), pressing, passing through at least one roller assembly to apply a compression or mechanical force, as part of an automated apparatus used in the industrial extraction and processing of plant materials, or combinations thereof.

Following removal of the leaves from the branches, the leaves and the branches are separated. This can be done by shaking the plant to allow the leaves to fall off the branch, or by shaking the plant material over a sieve or a vibrating mesh belt having perforations with pore sizes large enough so that the smaller leaves can pass through but small enough so that the larger branches remain on the sieve. The leaves can be collected and further processed to extract desirable materials. In the case of Guayule, the leaves can be used for extraction of high quality wax. In some embodiments, the plant material can be placed on the sieve or vibrating mesh, and shaken, which could serve two purposes simultaneously, applying a compression or mechanical force to remove the brittle leaves from the branches, and allowing the smaller leaves to fall through the sieve while keeping the larger branches on the sieve. Any combination of the above separation techniques is also within the scope of the present disclosure.

At this point the branches can milled, crushed, or pulverized and processed by methods known in the art to extract desirable materials from the branches. Additionally, the branches can be debarked. In some embodiments, the branches can have their leaves and bark removed all at once. For some plants, the bark can be the source of the desired materials, so separating the bark from the branch could help improve quality and yield of the desired product. In the case of Guayule, the bark is the source of the latex, and thus, it is desirable to have bark which is separate from the woody core of the branches, which contain undesirable products and contaminants that must be removed during processing methods.

Methods of Debarking

The current disclosure also provides methods of debarking (decorticating) a branch and separating bark from the woody cores of the branches. In one embodiment, in order to remove the bark from their woody cores, the branches are optionally contacted with a cryogenic liquid, for a period of time sufficient to freeze the bark to make the bark brittle while not freezing the woody core of the branches, or not freezing the woody core of branches too long so that they become brittle and shatter upon a compression or mechanical force. The period of time sufficient to freeze the bark but not freeze the woody cores of the branches to the point of making them brittle will be greater than that for freezing the leaves, and will depend on the particular plant, and the size of the branches and the thickness of the bark. The period of time sufficient to freeze the bark will also depend on the temperature of the cryogenic liquid and form of the cryogenic liquid, for example, exposure to cryogenic vapor may take longer to freeze a sample than exposure of the material to cryogenic liquid.

In one embodiment, the branches can be completely frozen solid and made brittle. In another embodiment, the branches can be completely frozen solid, followed by a rapid defrost.

Following exposure of the branches to the cryogenic liquid, a compression or mechanical force is applied to the branches, the compression or mechanical force being enough to break the brittle, frozen bark off the branches in order to separate the bark from the branches. For automated processes, a compression plate or rollers are more suitable for use in industrial sized extraction processes. The force applied may be done by any of the means described above. This compression or mechanical force for removing bark from the branches will be larger than that for leaves, as the leaves are more brittle than the bark. As mentioned above, the compression or mechanical force applied in measurable units will vary depending on the source of the compression or mechanical force, the type of plant being used, as would be appreciated by one of ordinary skill in the art.

Following removal of the bark from the branches, the bark and the woody core of the branches are separated. This can be done by shaking the branches over a sieve or a vibrating mesh belt having perforations of appropriate size as to allow the small bark pieces to pass while retaining the larger woody core of the branch. The bark and wood may also be separated using density separation methods known in the art. The bark can be collected and further processed to extract desirable materials. The bark and wood may also be separated using density separation methods known the art. This process provides a rapid debarking method to further enhance the extraction and manufacturing of plant products, and in particular, thin filmed latex products. The debarked branches could be further processed and used for other purposes, or desirable products, such as resins, can be extracted from the debarked branches using methods known in the art. In one embodiment, the separation of the leaves from the branches and debarking the branches can be performed simultaneously. In another embodiment, the leaves and bark may be removed together.

As noted above, methods are provided for both batch removal of leaves from branches and debarking, as well as for a continuous process, more applicable for industrial purposes. The steps of the method, as described above, can be part of a continuous conveyor system where the harvested plant extract has its leaves removed and debarked, separating the leaves, bark, and woody core of branches, and then allowing each component to continue through the conveyor system for downstream processing methods known in the art.

Extraction of Latex from Guayule

Guayule (*Parthenium argentatum*) is a desert shrub native to the southwestern United States and northern Mexico and which produces polymeric isoprene essentially identical to that made by *Hevea* rubber trees (e.g., *Hevea brasiliensis*) in Southeast Asia. Guayule normally yields one half ton to one ton of rubber per acre in cultivation when, after two or three years, the entire plant is harvested and processed. Guayule plants store latex in tiny inclusions in the bark, making harvesting of the outer fibrous layers, or bagasse, of the plant, desirable. Guayule is a particularly useful source of latex because it does not have the allergens that are present in the more widely used source of latex, *Hevea*, which causes allergic reactions to latex in a portion of the population. Therefore, latex extracted from Guayule provides a source of hypoallergenic latex products. In 2008, the U.S.

FDA approved for marketing the first device made from Guayule latex, the Yulex Rubber Examination Glove by the Yulex Corporation.

Extraction of Latex from Guayule

Extracting latex from plants, for example Guayule, for production of latex products such as medical gloves, elastic threads, and balloons, involves generally, homogenizing the entire hedged Guayule plant in aqueous media. Latex is found primarily in the bark and must be released during processing.

Production of thin filmed latex for medical gloves, elastic threads, balloons and condoms requires that a relatively pure, consistent, non-coagulated latex emulsion be extracted from the plant. A non-coagulated emulsion allows the thin filmed latex product to be molded into its desired shape, for example, in the shape of a hand during production of latex gloves. In traditional methods, branches are ground into a thick liquid suspension or slurry by gently breaking open the cells in the plant, releasing intact rubber particles and creating an aqueous suspension, homogenate or slurry which is placed in a centrifuge for separation. Since the Guayule rubber particles are lighter than the aqueous solution, they are separated from the suspension by floating. The rubber portion of the mixture is culled off the top and purified into latex. The inventors have observed that if over-freezing of the plant product occurs during the process of leaf removal, this can lead to a loss in yield of latex extracted for use in thin filmed products. The inventors have also observed that if the harvested plant is exposed to the cryogenic liquid for too long, a slow thaw will lead to a loss of yield of extracted thin film latex, while a rapid defrost prevents this loss of yield. Over freezing and slow thawing leads to irreversible coagulation of the latex in the parenchymal cells, thus reducing the yield significantly, but not affecting rubber yield. The methods described herein are such that irreversible coagulation of the latex during the processing is minimized, thereby improving yield and consistency of the latex end product.

Extracting Latex from Other Natural Rubber Producing Plants

Other plant species that can be used in making natural rubber include, but are not limited to, gopher plant (*Euphorbia lathyris*), mariola (*Parthenium incanum*), rabbitbrush (*Chrysothamnus nauseosus*), candelilla (*Pedilanthus macrocarpus*), Madagascar rubbervine (*Cryptostegia grandiflora*), milkweeds (*Asclepias syriaca, speciosa, subulata,* et al.), goldenrods (*Solidago altissima, graminifolia, rigida,* et al.), Russian dandelion (*Taraxacum kok-saghyz*), mountain mint (*Pycnanthemum incanum*), American germander (*Teucreum canadense*), and tall bellflower (*Campanula americana*). Many other plants which produce rubber and rubber-like hydrocarbons are known, particularly among the Asteraceae (Compositae), Euphorbiaceae, Campanulaceae, Labiatae, and Moraceae families. All of these non-*Hevea* natural rubber sources are capable of being used in the disclosed process to make thin film materials.

Extraction of Latex from Defoliated and Debarked Natural Latex Plant Species for Solid Rubber Applications Coagulation of latex is desired for the production of solid rubber. When solid rubber is produced by organic solvent extraction, the rubber and non-rubber components can be separated based on differential solubility. Using traditional techniques, as much as 95% of the available natural rubber may be recovered from plant materials, using parboiling, which coagulates the latex in the cells, followed by a milling step in a caustic solution to release the rubber. This traditional process then causes the milled bagasse to sink to the bottom of the processing vessel and allows rubber to float to the surface for collection. In more recent methods, the rubber from the shrub is generally extracted using hydrocarbon solvents such as hexane, cyclohexane or toluene. Such processes are normally very expensive and not environmentally friendly. Furthermore, in traditional processes, resins from plant materials are obtained by solvent extraction with polar solvents such as alcohols, ketones, and esters. A commonly used solvent for extracting the guayule resin is acetone. The resin is recovered from the solution by evaporating the solvent.

Further, using traditional methods of guayule processing, plant material is prepared by initially grinding it into small particles. Generally, the entire plant is fed whole, that is, with the leaves thereon, as well as dirt or foreign debris, into a grinding apparatus, for example, a hammermill. The entire shoot may also be harvested and processed while leaving the roots in the ground. The ground material can be flaked, then crushed, by adding to a two-roll mill or other conventional equipment, which ruptures the rubber-containing cells. The comminuted plants are subjected to a resin-rubber solvent system. The solvent system contains one or more solvents which extract the resin as well as the rubber from the guayule-type shrub. Alternatively, the resin may be first extracted with a solvent, such as acetone, and then the rubber extracted with an organic solvent. Examples of single-solvent systems include halogenated hydrocarbons having from 1 to 6 carbon atoms, such as chloroform, perchloroethylene, chlorobenzene, and the like; and aromatic hydrocarbons and alkyl-substituted aromatic hydrocarbons having from 5 to 12 carbon atoms, such as benzene, toluene, xylene, pentane, hexane, cyclohexane and the like.

The solvent simultaneous extraction system typically contains one or more polar resin solvents as well as one or more hydrocarbon rubber solvents. Typical polar resin solvents include alcohols having from 1 to 8 carbon atoms, such as methanol, ethanol, isopropanol and the like; esters having from 3 to 8 carbon atoms such as the various formates, the various acetates and the like; ketones having from 3 to 8 carbon atoms, such as acetone, methyl ethyl ketone, and the like. Typically non-polar hydrocarbon rubber solvents include alkanes having from 4 to 10 carbon atoms, such as pentane, hexane, and the like; and cycloalkanes having from 5 to 15 carbon atoms, such as cyclohexane, decalin, the various monoterpenes, and the like. Although the two types of solvents can form a two-phase system, they often form a single phase when utilized in proper proportions. One manner of adding different type solvents to the shrub is separately, but simultaneously. However, they are generally prepared as a mixture and added as such.

More efficient commercial processing methods have been developed that involve homogenization and centrifugation to separate the lighter rubber from the rest of the plant materials. See for example, U.S. Pat. No. 7,259,231, U.S. Pat. No. 8,431,667, and WO 2007/081376. See also: Cornish, K. Hypoallergenic Natural Rubber Products from *Parthenium argentatum* (Gray) and other non-*Hevea brasiliensis* species, U.S. Pat. No. 5,580,942 and Cornish, K. Hypoallergenic Natural Rubber Products from *Parthenium argentatum* (Gray) and other non-*Hevea brasiliensis* species, U.S. Pat. No. 5,717,050.

Harvesting and Preparation of Plant Materials for Latex Extraction

Harvested plant materials may be obtained using a variety of conventional and experimental harvesting processes. Generally, plants are cultivated, harvested and bailed using standard farming practices. Various portions of a plant may be used to obtain plant materials, including leaves, bark, stems, root systems or root balls.

For some applications, the plants need not be defoliated because the metal ions such as manganese, iron and copper in the leaves that could promote oxidative degradation of the rubber are not extracted into the rubber solvents. Further, processing the plant, including the leaves, may add to the quality of the bagasse because the leaves contain mineral, nitrogenous and carbohydrate components that could enhance the quality of the bagasse for certain post-processing applications. However, for production of thin filmed latex for medical devices and other uses, it is important to have a relatively pure latex sample able to form an aqueous slurry, with minimal coagulation, and thus, the plants need to be defoliated. The leaves could be added back to the bagasse as indicated by specific downstream applications.

Additional Plant-Derived Products

The methods described herein can be used in the extraction and manufacturing process of other plant derived products, for examples, extraction of chemical substances used in pharmaceutical compositions, nutriceuticals, make-up and skin applications, perfumes, fragrance bases, flavorings, non-rubber polymers, such as starches and polysaccharides, waxes, fats, bioherbicides, and biopesticides, amongst others.

EXAMPLES

Example 1. Latex Extraction Using Hydrated Branches

Figure 1:
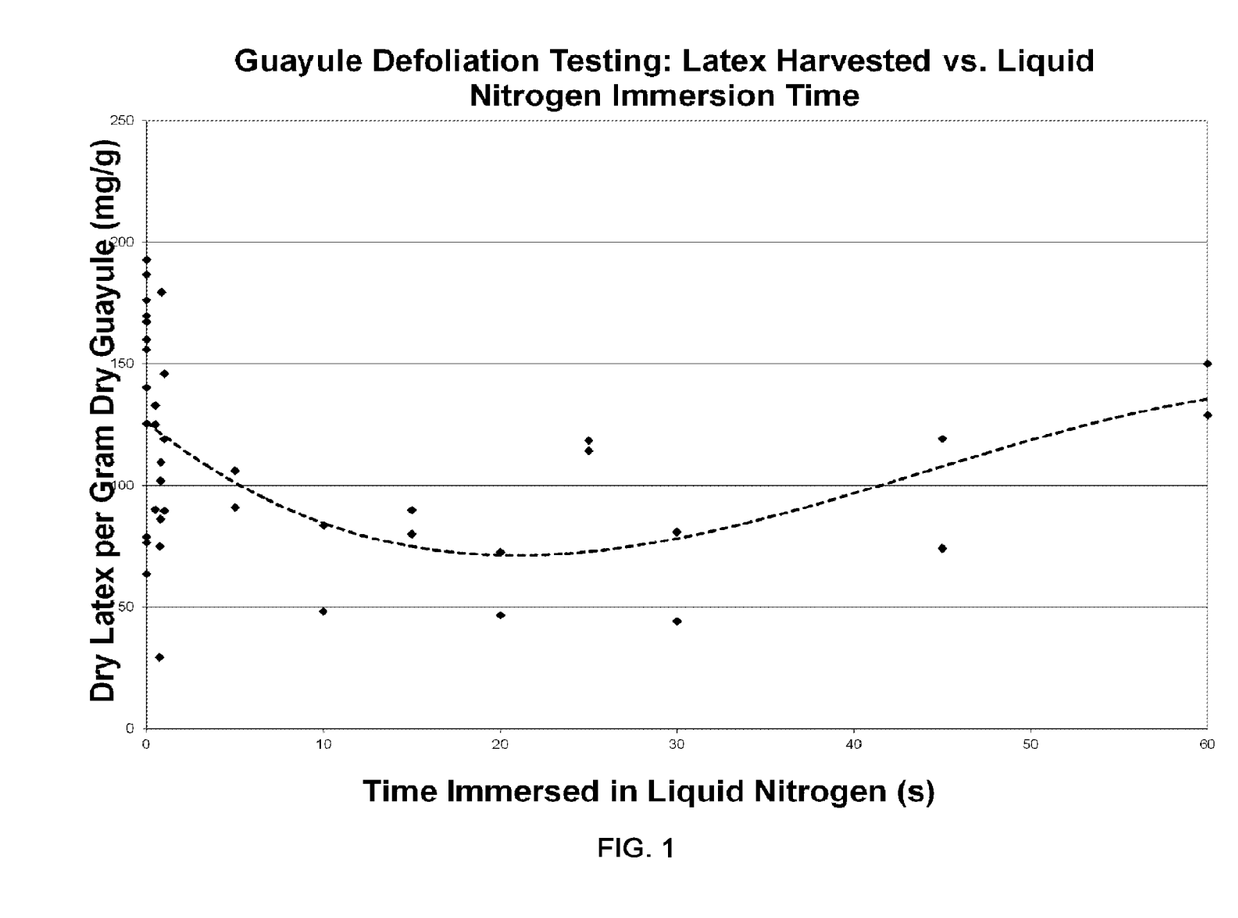
FIG. 1. Graph of amount of dry latex per gram extracted from dehydrated Guayule versus liquid nitrogen immersion time.

Fresh, hydrated Guayule plant material was immersed in liquid nitrogen for varying times, followed by hitting the plant with a flat object to remove the leaves. The branches were then milled and homogenized, followed by latex extraction using traditional methods. It was observed that the amount of latex recovered after flash freezing in liquid nitrogen rapidly declined during 1-5 seconds of immersion with the longer times yielding progressively less latex upon thawing and homogenization, and latex quantification using the established, published latex quantification procedure. Indeed it appeared that 0.8 secs was the maximum time that did not freeze the smallest stems on the shrub (FIG. 1). This was confirmed when small branches (FIG. 2) and large branches (FIG. 3) were separated before freezing. It was also observed that very long freezing times of at least one minute also protected the latex from coagulation during subsequent thawing (FIGS. 1-3), but this procedure would be slower and more expensive than the 0.8 second process.

Example 2. Effects of Thawing on the Amounts of Extracted Latex

Figure 4:
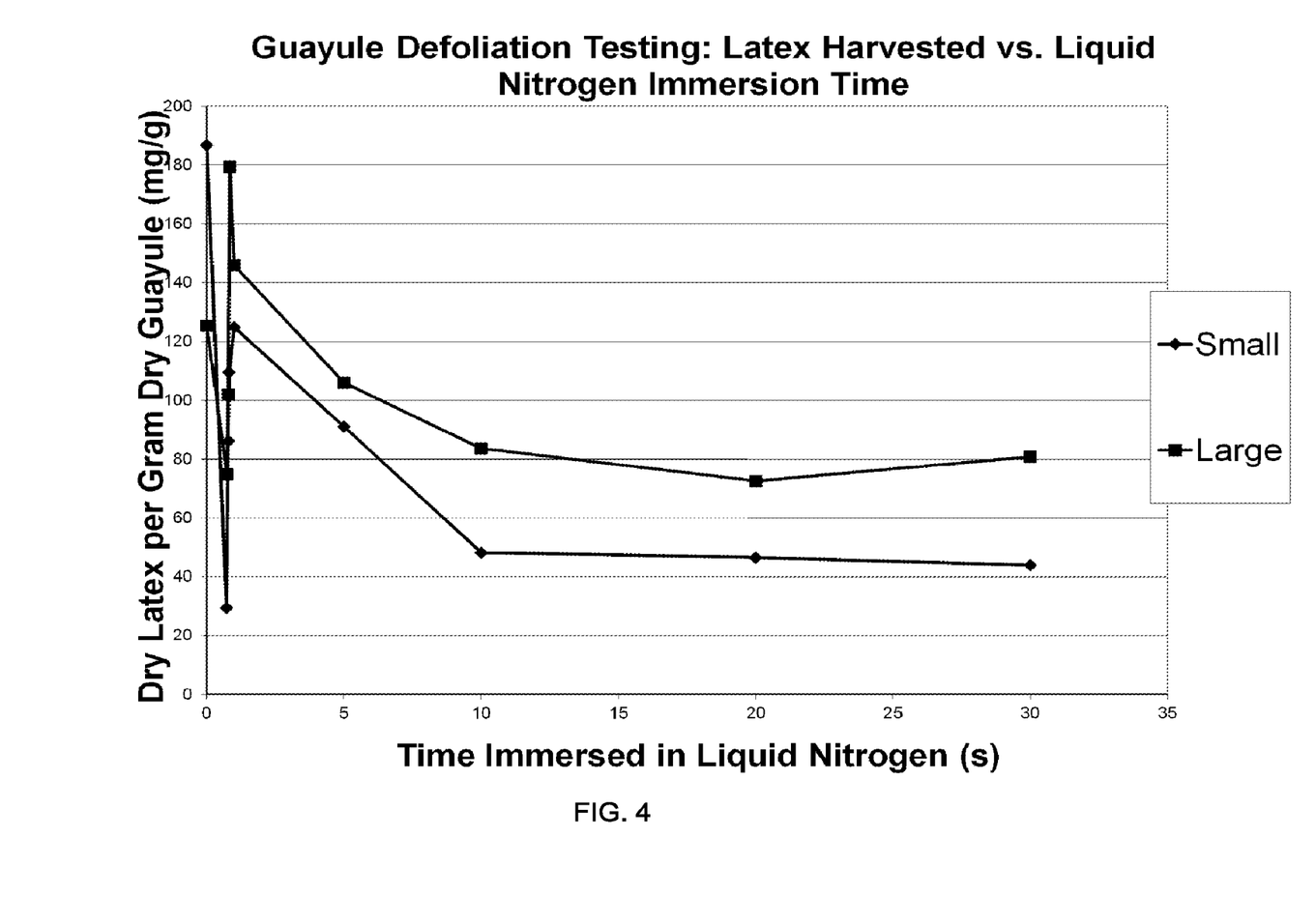
FIG. 4. Graph of dry weight per plant weight of latex extracted from small and large branches versus time of thawing after liquid nitrogen immersion.

Small and large Guayule branches were separated and immersed in liquid nitrogen for one minute to allow complete freezing, followed by allowing the branches to thaw for varying periods of time before homogenization and latex extraction. It was observed that if the Guayule is allowed to thaw at ambient temperature following immersion in liquid nitrogen before being placed in buffer and homogenized, less latex was extracted (FIG. 4). The longer the period of time the branches were allowed to thaw, the less amount of latex that was extracted. The decline was more dramatic for smaller branches compared to larger branches. Thus, allowing the branches to thaw more slowly increases the coagulation of the latex in situ, which is not desired for production of thin film latex and other latex products.

Example 3. Effect of Varying Immersion Times and Latex Extracted

Figure 2:
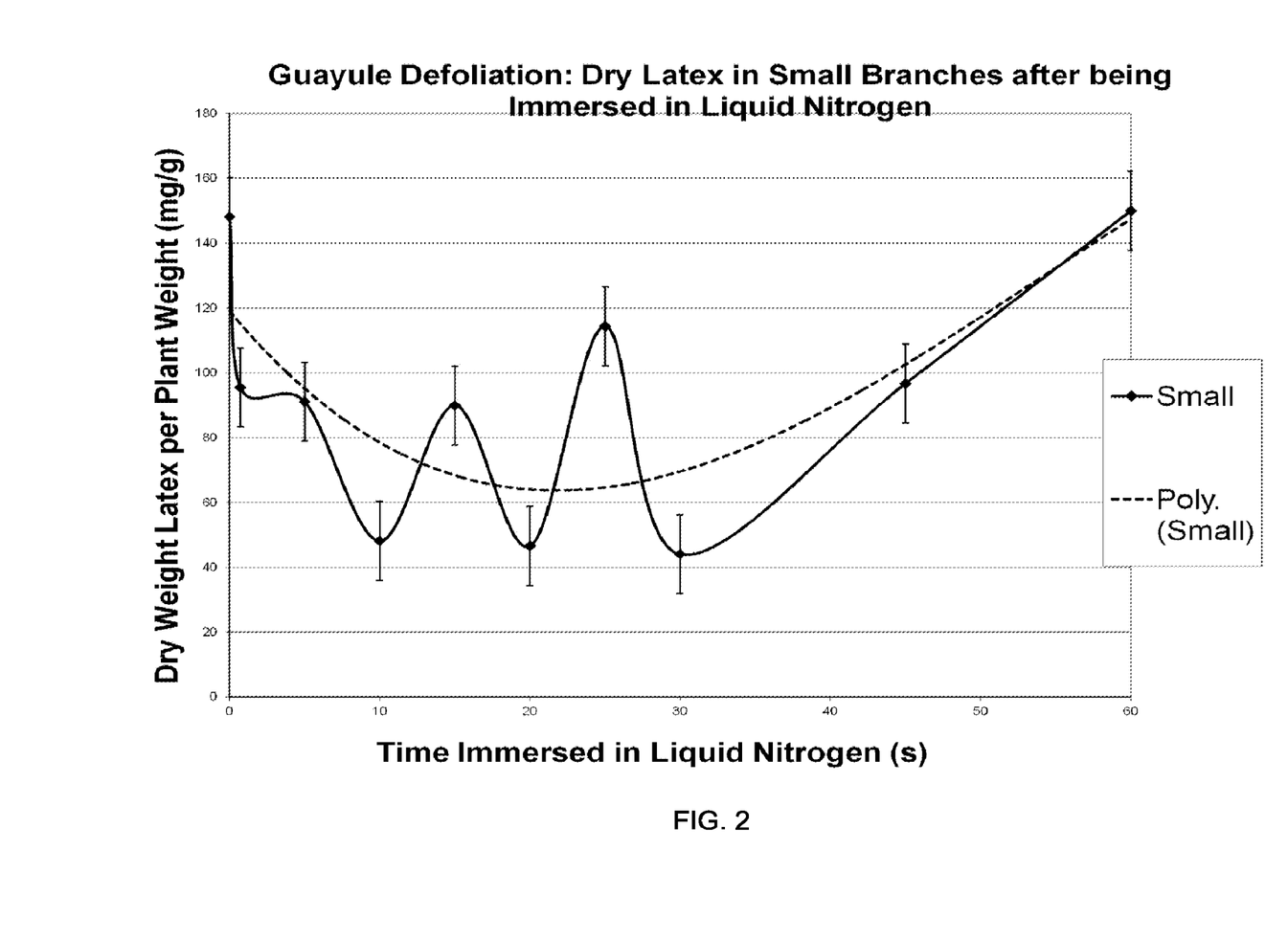
FIG. 2. Graph of dry weight of latex extracted per plant weight in small branches from dehydrated Guayule versus liquid nitrogen immersion time.
Figure 3:
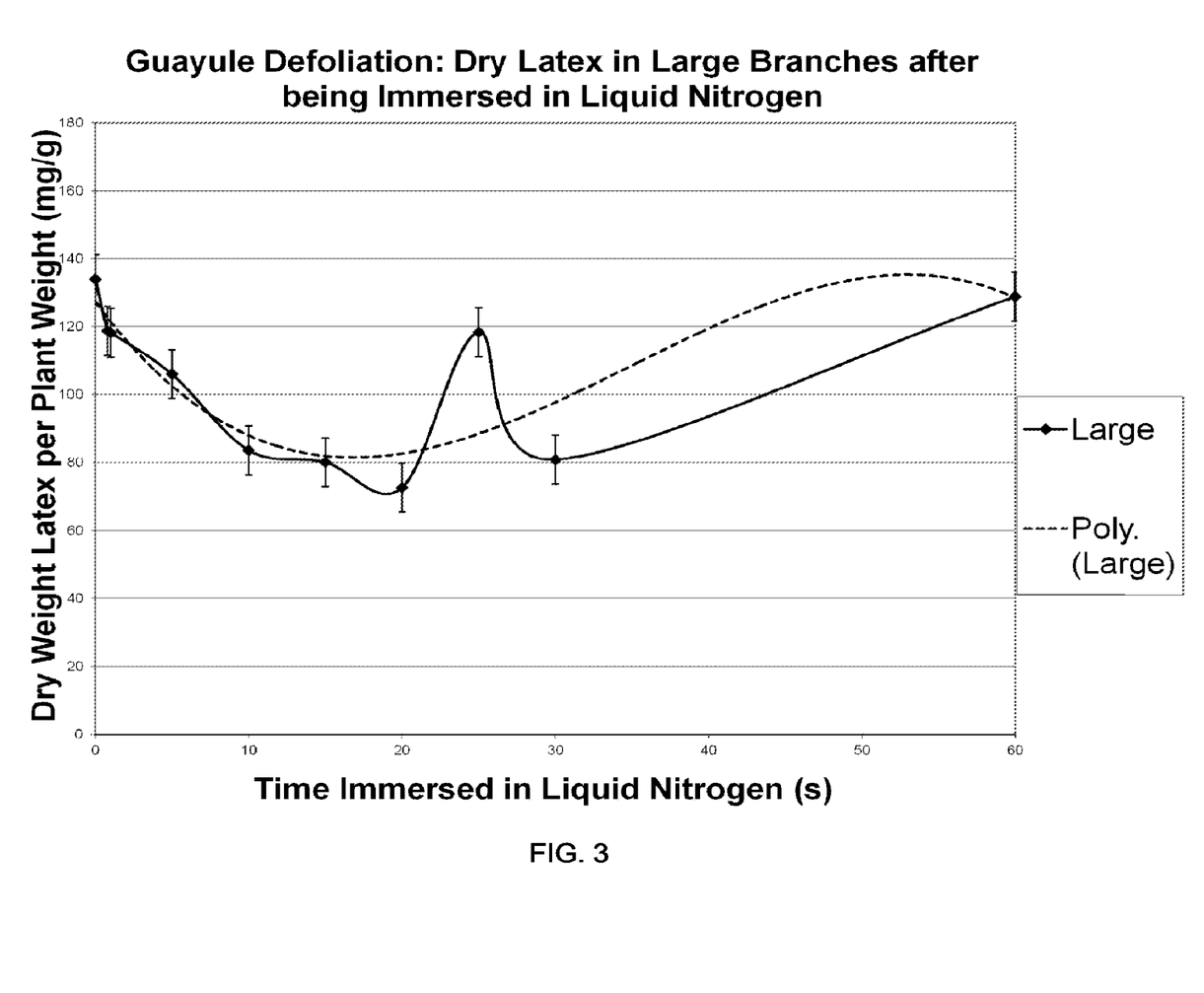
FIG. 3. Graph of dry weight latex extracted in large branches from dehydrated Guayule versus liquid nitrogen immersion time using dried Guayule.
Figure 5:
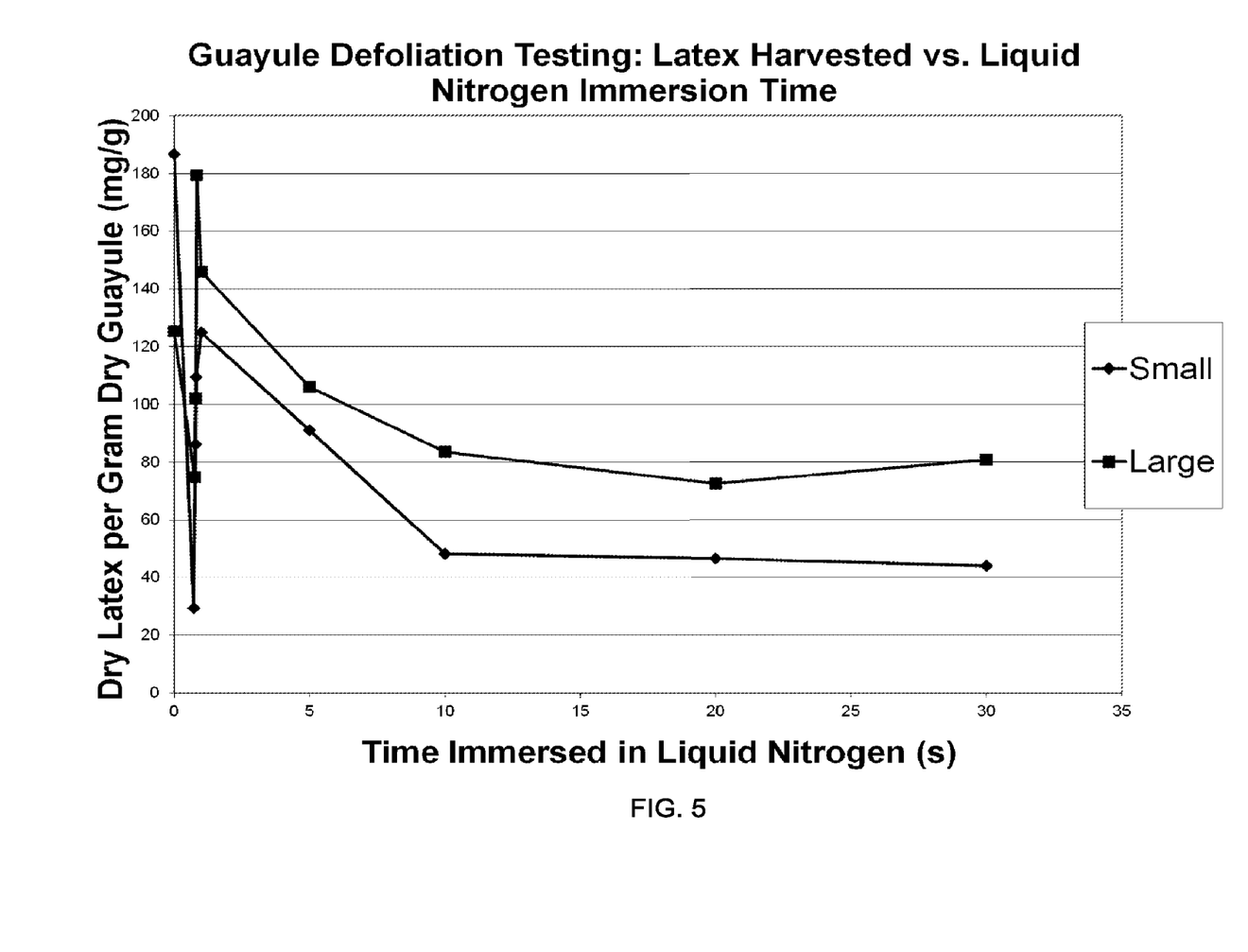
FIG. 5. Graph of dry latex per gram Guayule extracted from hydrated Guayule versus liquid nitrogen immersion time.
Figure 6:
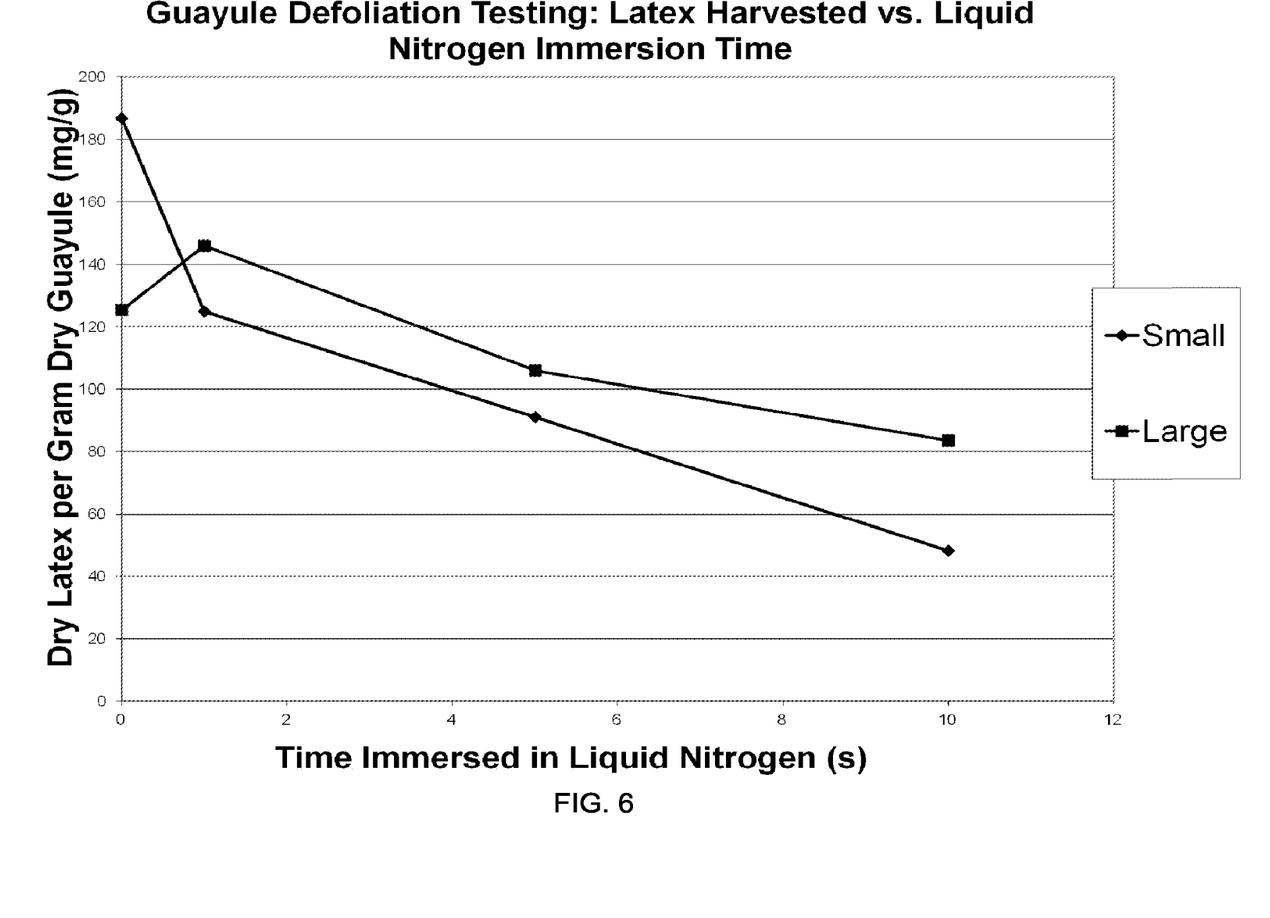
FIG. 6. Graph of dry latex per gram Guayule extracted from hydrated Guayule versus liquid nitrogen immersion time.

Small and large branches were immersed in liquid nitrogen for varying times and then latex was extracted from the branches (FIG. 5 and FIG. 6). The results show a brief immersion time of about 0.5-2 seconds generally gave good latex yields, which was reduced when the branches were exposed to longer periods of immersion, greater than about 2 seconds. The yield of the latex continued to decline up until 10 seconds, and then level off. Immersion times longer than 10 seconds did not cause any further drop in yield, likely because complete freezing of the plants occurred at 10 second. It also was observed that freezing times of at least 60 seconds also protect the latex from coagulation during subsequent thawing and extraction (FIGS. 1-3).

What is claimed is:

1. A method of separating leaves from branches of harvested latex-containing plant material, wherein the harvested plant material includes leaves, and branches comprised of latex-containing bark and woody cores, the method comprising:
   a) contacting the harvested plant material with a cryogenic liquid for an amount of time sufficient to embrittle a plurality of leaves and a plurality of latex-containing bark;
   b) applying a force to the harvested plant material of step a) sufficient to fracture the plurality of embrittled leaves and the plurality of latex-containing embrittled bark, to form fractured leaf particles, and fractured bark particles; and
   c) separating the embrittled fractured leaf particles and the embrittled fractured bark particles of step b) from the woody cores.

2. The method of claim 1, wherein in step c) the separating is by a method selected from the group consisting of: agitation; vibration; air velocity force; sonic wave force; liquid separation; filtration; electrical force; static electrical force; density separation; particle size separation; screen separation; sieve separation; mesh separation; and threshing.

3. The method of claim 1, wherein in step a) the harvested plant material is contacted with the cryogenic liquid for an amount of time selected from the group consisting of: at least about 0.5 seconds to about 3 seconds; at least about 0.5 seconds to about 2 seconds; at least about 0.5 seconds to about 1.5 seconds; at least about 0.5 seconds to about 1 second; at least about 0.8 seconds.

4. The method of claim 1, which further comprises: rapidly defrosting the embrittled latex-containing bark.

5. The method of claim 1, wherein the cryogenic liquid is at least one cryogenic liquid selected from the group consisting of: liquid nitrogen and/or liquid nitrogen vapor; liquid helium and/or liquid helium vapor; liquid neon and/or liquid neon vapor; liquid argon and/or liquid argon vapor; and liquid krypton and/or liquid krypton vapor; liquid hydrogen and/or liquid hydrogen vapor; liquid methane and/or liquid methane vapor; liquefied natural gas and/or liquefied natural gas vapor.

6. The method of claim 1, wherein in step a) contacting is achieved by at least one method selected from the group consisting of: spraying; dipping; pouring; gasifying; and exposing.

7. The method of claim 1, wherein in step a) contacting is achieved in a vessel selected from the group consisting of: open vat; closed vat; bucket; open chamber; closed chamber; package; box; and bag.

8. The method of claim 1, wherein in step b) applying a force is via at least one means selected from the group consisting of: one or more roller assemblies; one or more flat objects; and one or more plates.

9. The method of claim 1, wherein the method is performed in a continuous process on a conveyor system.

10. The method of claim 1, wherein the harvested latex-containing plant material is selected from: Guayule (*Parthenium argentatum*); rabbitbrush (*Chrysothanmus nauseosus*); Russian dandelion *Taraxacum kok-saghyz*; gopher plant (*Euphorbia lathyris*); mariola (*Parthenium incanum*); candelilla (*Pedilanthus macrocarpus*); Madagascar rubbervine (*Cryptostegia grandiflora*); milkweeds (including *Asclepias syriaca, speciosa, subulata*); goldenrods (including *Solidago altissima, graminifolia, rigida.*); mountain mint (*Pycnanthemum incanum*), American germander (*Teucreum canadense*), tall bellflower (*Campanula americana*), and a rubber-producing plant selected from Asteraceae (Compositae), Euphorbiaceae, Campanulaceae, Labiatae, and Moraceae families.

11. The method of claim 4, wherein defrosting of the embrittled latex-containing material is achieved within a time period from the beginning of contact with the cryogenic liquid selected from the group consisting of: no longer than 11 seconds; no longer than 10 seconds; no longer than 9 seconds; no longer than 8 seconds; no longer than 7 seconds; no longer than 6 seconds; no longer than 5 seconds; no longer than 4 seconds.

12. The method of claim 1, further comprising:
d) collecting the embrittled fractured latex-containing bark of step c);
e) grinding the collected bark of step d) to form a homogenate;
f) combining the homogenate with at least one solvent to extract a plurality of latex from the homogenate of step e) to form extracted latex;
g) purifying the extracted latex; and
h) producing a natural rubber latex; and
optionally using the natural rubber latex of step h) for thin film applications.

13. The method claim 1, further comprising:
d) collecting the embrittled fractured latex-containing bark particles of step c);
e) comminuting the bark particles of step d) to a form a bagasse;
f) combining the bagasse with the at least one solvent to extract a plurality of latex from the homogenate to form extracted latex;
g) purifying the extracted latex; and
h) producing natural rubber latex; and
optionally using the natural rubber latex of step h) for thin film applications.

14. The method of claim 1, wherein the harvested plant is not dehydrated prior to contacting with the cryogenic liquid.

15. The method of claim 1, wherein the harvested plant is hydrated prior to contacting with the cryogenic liquid.

* * * * *